W. PUTNAM AND G. D. LONGMAN.
GRAIN DRIER.
APPLICATION FILED OCT. 21, 1919.

1,365,950.

Patented Jan. 18, 1921.

WITNESSES
A. Gutzwagel
A. W. Foster

INVENTORS
Wilber Putnam,
G. D. Longman.
BY
Munn & Co
ATTORNEYS

UNITED STATES PATENT OFFICE.

WILBER PUTNAM AND GARFIELD D. LONGMAN, OF THORNWELL, LOUISIANA.

GRAIN-DRIER.

1,365,950.        Specification of Letters Patent.        Patented Jan. 18, 1921.

Application filed October 21, 1919. Serial No. 332,188.

*To all whom it may concern:*

Be it known that we, WILBER PUTNAM and GARFIELD D. LONGMAN, citizens of the United States, and residents of the city of Thornwell, in the parish of Jefferson Davis and State of Louisiana, have invented a new and Improved Grain-Drier, of which the following is a full, clear, and exact description.

This invention relates to improvements in grain driers, an object of the invention being to provide an improved apparatus which is designed to dry or cure the heads of grain as gathered from the field, and is especially adapted for curing rice, but which may of course be used for other grain.

A further object is to provide an apparatus of the character stated, which will rapidly and economically cure an unlimited quantity of grain directly as such grain comes from the field and before it is threshed, thus resulting in the prevention of great loss from wet weather which loss has been extremely large in the past.

With these and other objects in view, the invention consists in certain novel features of construction and combinations and arrangements of parts as will be more fully hereinafter described and pointed out in the claims.

Figure 1:
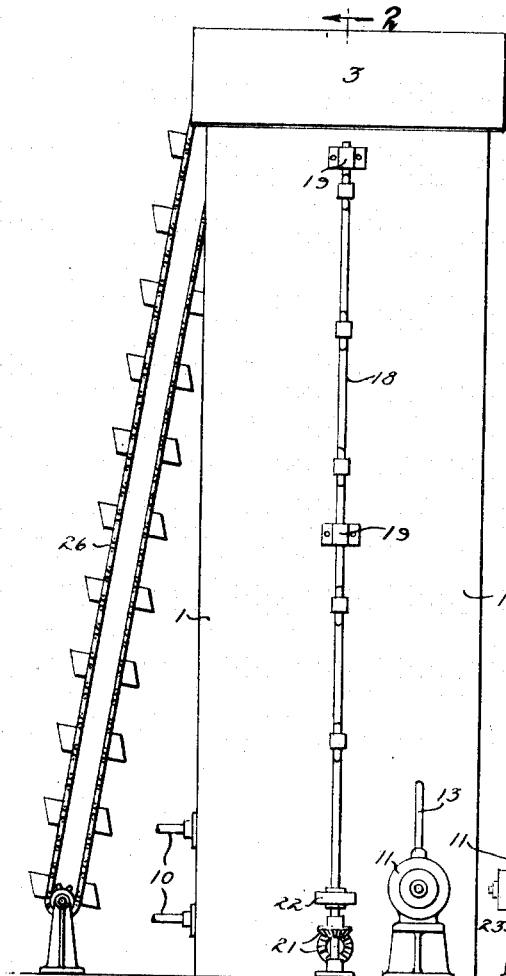
Figure 1 is a view in side elevation, illustrating our improved apparatus.
Figure 2:
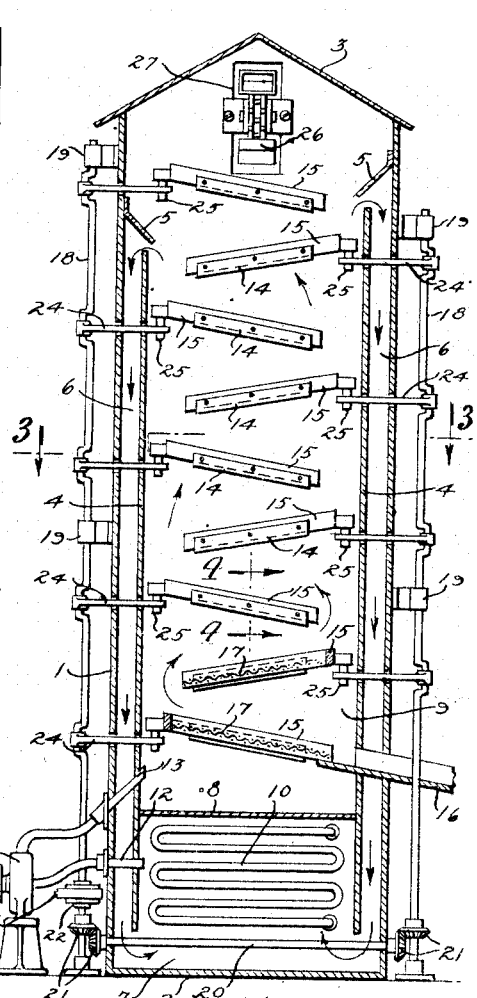
Fig. 2 is a view in longitudinal section on the line 2—2 of Fig. 1.
Figure 3:
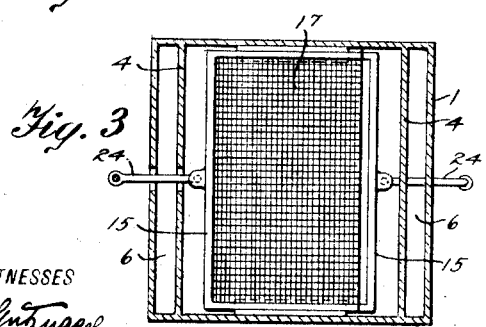
Fig. 3 is a view in transverse section on the line 3—3 of Fig. 2.
Figure 4:
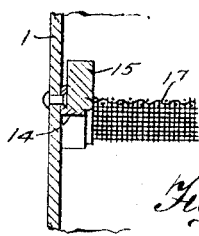
Fig. 4 is a large fragmentary view in section illustrating the mounting of one of the racks on the line 4—4 of Fig. 2.

1 represents a vertical casing of any desired size and material, having a bottom 2, and top 3, and provided with internal vertical partitions 4 spaced from the walls of the casing. These partitions terminate short of the bottom 2 and short of the top 3, and inclined deflectors 5 are positioned over the spaces between the partitions and walls to prevent the grain from falling therebetween.

The partitions coöperating with the walls of the casing form air return passages 6 to a heating chamber 7 at the bottom of the casing and having a top 8 which constitutes the bottom of the drying chamber 9.

A steam coil 10 is provided in the heating chamber 7, and receives its steam from any desired source to heat the air in the chamber.

A blower 11 is provided and has an inlet pipe 12 communicating with the chamber 7 and an outlet pipe 13 communicating with the lower portion of chamber 9, thus compelling a circulation from the heating chamber 7 into the lower end of the drying chamber 9, thence up through the drying chamber, and down the flues 6 to the heating chamber again in a complete continuous circuit.

Inclined guide rails 14, preferably of angle iron, are secured to the sides of the casing and support shaking racks 15. The racks have staggered arrangement so that each rack discharges into the rack next below, and the lowest rack discharges into an outlet spout 16.

The racks have just the necessary angle or pitch to give the desired feed, and each rack has a perforated bottom 17 of wire mesh, or other suitable material which will permit a free passage of air therethrough but prevent the passage of grain, the latter moving over the end of the rack onto the rack next below.

To shake or reciprocate the racks, a pair of vertical crank shafts 18 are supported in bearing brackets 19 on the outside of the casing, and a shaft 20 projects through the lower portion of the casing and is connected by bevel gears 21 with the respective crank shafts, compelling them to turn together. A pulley 22 is provided on one of the shafts 18 and motion is transmitted thereto by a belt 23 from any desired source of power.

Links 24 connect the cranks of the shaft 18 with pins 25 on the racks 15 so that the turning of the shafts causes a shaking or reciprocating motion to be imparted to the racks.

It is obvious that the invention is not limited to the particular mechanical devices between the shafts and the racks as any well known mechanism may be employed for the purpose.

An endless conveyer 26 is shown for conveying the grain through a grain inlet 27 in the upper portion of the casing 1, but it is of course to be understood that the grain might be deposited in the casing in any way desired.

The operation is as follows:

The grain falling onto the upper rack 15, is caused to move longitudinally thereof and over the end of the rack and falls onto the rack 15 next below, and so on down to the bottom rack and thence out of the casing.

This movement of the grain is facilitated by the inclination of the rack and the shaking action and during its movement it is subjected to the drying action of the ascending hot air passing through the racks and between the grain as the latter falls from rack to rack.

Various slight changes might be made in the general form of the parts described without departing from our invention, and hence we do not limit ourselves to the precise detials set forth but consider ourselves at liberty to make such slight changes and alterations as fairly fall within the spirit and scope of the appended claims.

We claim:

1. A grain drier, comprising a casing having a heating chamber in its lower portion and a drying chamber above the same, a series of inclined perforated racks in the drying chamber and means compelling a circuit of air from the heating chamber through the drying chamber and back to the heating chamber.

2. A grain drier, comprising a casing, vertical partitions in the casing forming flues at the side walls of the casing, a horizontal partition connecting the vertical partitions and forming a lower heating chamber and an upper drying chamber, a steam coil in the heating chamber, inclined perforated shaking racks in the drying chamber, a blower, a pipe connecting the inlet of the blower with the heating chamber, and a pipe connecting the outlet of the blower with the lower portion of the drying chamber.

3. A grain drier, comprising a casing having an inlet at its upper end, an outlet at its lower end, and vertical flues at its sides, inclined perforated racks supported in vertical series in the casing, heating means, a blower compelling a circulation of air from said heating means, up through the racks and down the flues back to the heating means, inclined deflectors over the upper ends of the flues, means for reciprocating the racks, and an endless conveyer for directing grain through said inlet onto the highest rack.

4. A grain drier, comprising a casing having a heating chamber in its lower portion and a drying chamber above the same, a series of inclined perforated racks in the drying chamber, means compelling a circuit of air from the heating chamber through the drying chamber and back to the heating chamber, vertical crank shafts mounted outside of the casing, links connecting the crank shafts with the racks, and means for simultaneously turning said crank shafts.

5. A grain drier, comprising a casing, vertical partitions in the casing forming flues at the side walls on the casing, a horizontal partition connecting the vertical partitions and forming a lower heating chamber and an upper drying chamber, a steam coil in the heating chamber, inclined perforated shaking racks in the drying chamber, a blower, a pipe connecting the inlet of the blower with the heating chamber, a pipe connecting the outlet of the blower with the lower portion of the drying chamber, vertical crank shafts mounted outside of the casing, links connecting the crank shafts with the racks, and means for simultaneously turning said crank shafts.

WILBER PUTNAM.
GARFIELD D. LONGMAN.